United States Patent
Funato et al.

(10) Patent No.: US 12,062,797 B2
(45) Date of Patent: Aug. 13, 2024

(54) SQUARE BATTERY

(71) Applicant: Prime Planet Energy & Solutions, Inc., Tokyo (JP)

(72) Inventors: Minehiro Funato, Toyota (JP); Yosuke Shimura, Nagoya (JP); Hideki Asadachi, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 27 days.

(21) Appl. No.: 17/521,111

(22) Filed: Nov. 8, 2021

(65) Prior Publication Data
US 2022/0149461 A1   May 12, 2022

(30) Foreign Application Priority Data

Nov. 9, 2020  (JP) ................. 2020-186415

(51) Int. Cl.
H01M 50/103 (2021.01)
H01M 50/169 (2021.01)

(52) U.S. Cl.
CPC ....... H01M 50/103 (2021.01); H01M 50/169 (2021.01)

(58) Field of Classification Search
CPC ...... Y02E 60/10; Y02P 70/50; H01M 50/103; H01M 10/04; H01M 50/15; H01M 50/169; H01G 11/78
See application file for complete search history.

(56) References Cited

U.S. PATENT DOCUMENTS

| | | | |
|---|---|---|---|
| 9,391,308 B2 * | 7/2016 | Tsunaki | H01M 50/103 |
| 10,355,252 B2 * | 7/2019 | Matsuura | H01M 50/136 |
| 2008/0160234 A1 | 7/2008 | Yoshida et al. | |
| 2014/0038003 A1 | 2/2014 | Tsunaki et al. | |
| 2015/0140413 A1 | 5/2015 | Suzuki et al. | |
| 2015/0200386 A1 | 7/2015 | Harayama et al. | |
| 2016/0361783 A1 | 12/2016 | Matsuura et al. | |

FOREIGN PATENT DOCUMENTS

| | | |
|---|---|---|
| CN | 101212030 A | 7/2008 |
| CN | 103493248 A | 1/2014 |
| CN | 104412412 A | 3/2015 |
| CN | 106252535 A | 12/2016 |
| JP | 2011-210464 A | 10/2011 |
| JP | 2013157299 A | 8/2013 |
| JP | 2016-143613 A | 8/2016 |
| JP | 20174902 A | 1/2017 |
| JP | 2017-107773 A | 6/2017 |
| JP | 2017200707 A | 11/2017 |
| KR | 101128665 B1 * | 3/2012 |

OTHER PUBLICATIONS

English translation KR20100044404A as taught by Lee et al (Year: 2012).*

* cited by examiner

*Primary Examiner* — Anca Eoff
(74) *Attorney, Agent, or Firm* — HAUPTMAN HAM, LLP

(57) ABSTRACT

A square battery includes a battery case containing therein an electrode body. The battery case includes a case main body having a square shape substantially in the form of a cuboid having an open side surface and a lid bonded to the case main body so as to close an opening of the case main body. The case main body includes a rectangular bottom surface portion, a pair of wider surface portions facing each other, and a pair of narrower surface portions facing each other. The wider surface portion and the narrower surface portion adjacent to each other are bonded together. In the opening of the case main body, an inner side of a corner portion between the wider surface portion and the narrower surface portion adjacent to each other has an R-shape, and an outer edge of the lid is welded to the inner side of the corner portion.

6 Claims, 4 Drawing Sheets

SQUARE BATTERY

CROSS REFERENCE TO RELATED APPLICATIONS

The present application claims priority based on Japanese Patent Application No. 2020-186415 filed on Nov. 9, 2020, the entire content of which is incorporated herein by reference in its entirety.

BACKGROUND OF THE INVENTION

Field of the Invention

The present invention relates to a square battery.

Description of the Related Art

In general, a battery such as a lithium ion secondary battery includes an electrode body, a battery case containing therein the electrode body, and a lid closing an opening of the battery case. As a form of such a battery, a square battery using a square (box-shaped) battery case is known. Conventional art literatures related to the square battery include Japanese Patent Application Publication No. 2017-107773, Japanese Patent Application Publication No. 2016-143613, and Japanese Patent Application Publication No. 2011-210464.

For example, in Japanese Patent Application Publication No. 2017-107773, it is described that, after a flat plate is folded to prepare a main body portion having a U-shaped cross-sectional shape, respective members each having a flat plate shape are welded to both end portions of the main body portion to produce a case main body having an open side surface, an electrode body is then contained within the case main body through an opening of the case main body, and subsequently a lid is welded to the case main body to close the opening and thus produce a square battery.

When the lid is welded to an inner side of the case main body, in terms of improving a production yield, it is desired to perform, e.g., one-pass laser welding. In the square battery case, the opening is typically formed into a rectangular shape, and accordingly four corner portions when the lid is welded to the inner side of the case main body have right angles. When laser light passes by one of the corner portions formed to have the right angles (i.e., when a moving direction thereof changes), a moving speed of the laser light becomes zero. As a result, the laser light is concentrated on the corner portion and an amount of heat applied to the corner portion is larger than an amount of heat applied to another portion, which may result in poor weld.

SUMMARY OF THE INVENTION

The present invention is achieved in view of the circumstances described above, and an object thereof is to provide a square battery in which a case main body and a lid are more reliably bonded together.

The present invention provides a square battery including an electrode body and a battery case containing therein the electrode body. The battery case includes a case main body having a square shape substantially in the form of a cuboid having an open side surface and a lid bonded to the case main body so as to close an opening of the case main body. The case main body includes a rectangular bottom surface portion, a pair of wider surface portions each having, as a side thereof, a longer side of the bottom surface portion and facing each other, and a pair of narrower surface portions each having, as a side thereof, a shorter side of the bottom surface portion and facing each other. The wider surface portion and the narrower surface portion adjacent to each other are bonded together. In the opening of the case main body, an inner side of a corner portion between the wider surface portion and the narrower surface portion adjacent to each other has a R-shape. An outer edge of the lid is welded to the inner side of the corner portion.

In the configuration described above, the wider surface portion and the narrower surface portion adjacent to each other are bonded together and, in the opening of the case main body, the inner side of the corner portion between the wider surface portion and the narrower surface portion adjacent to each other has the R-shape. As a result, when the lid is welded to an inner side of the case main body and when, e.g., laser light passes by the corner portion, a moving speed of the laser light does not become zero, and the laser light can move at a moving speed equal to that at which the laser light moves along the longer sides and the shorter sides of the case main body. Consequently, the laser light is not excessively concentrated on the corner portion, and an amount of heat applied to the corner portion is equal to an amount of heat applied to another portion. Thus, the outer edge of the lid is welded to the inner side of the corner portion having the R-shape, and therefore occurrence of poor weld is prevented and the lid and the case main body can more reliably be bonded together.

In a preferred aspect of the square battery disclosed herein, each of the narrower surface portions is formed with a first R-portion having the R-shape. By thus forming the narrower surface portion with the first R-portion, it is possible to easily provide the R-shape on the inner side of the corner portion between the wider surface portion and the narrower surface portion adjacent to each other.

In a preferred aspect of the square battery disclosed herein, the first R-portion is formed by compression molding or cutting machining Thus, by the compression molding or the cutting machining, the narrower surface portion can be formed integrally with the first R-portion, and therefore it is possible to simplify a structure of the case main body.

In a preferred aspect of the square battery disclosed herein, each of the wider surface portions is formed with a second R-portion having the R-shape. By thus forming the wider surface portion with the second R-portion, it is possible to easily provide the R-shape on the inner side of the corner portion between the wider surface portion and the narrower surface portion adjacent to each other.

In a preferred aspect of the square battery disclosed herein, the second R-portion is formed by beading. Thus, by beading, the wider surface portion can be formed integrally with the second R-portion, and therefore it is possible to simplify the structure of the case main body.

In a preferred aspect of the square battery disclosed herein, the bottom surface portion and the wider surface portions are included in a folded product obtained by folding a flat plate. This can improve a production yield of a material and also increase productivity and efficiency. Therefore, it is possible to reduce production cost.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
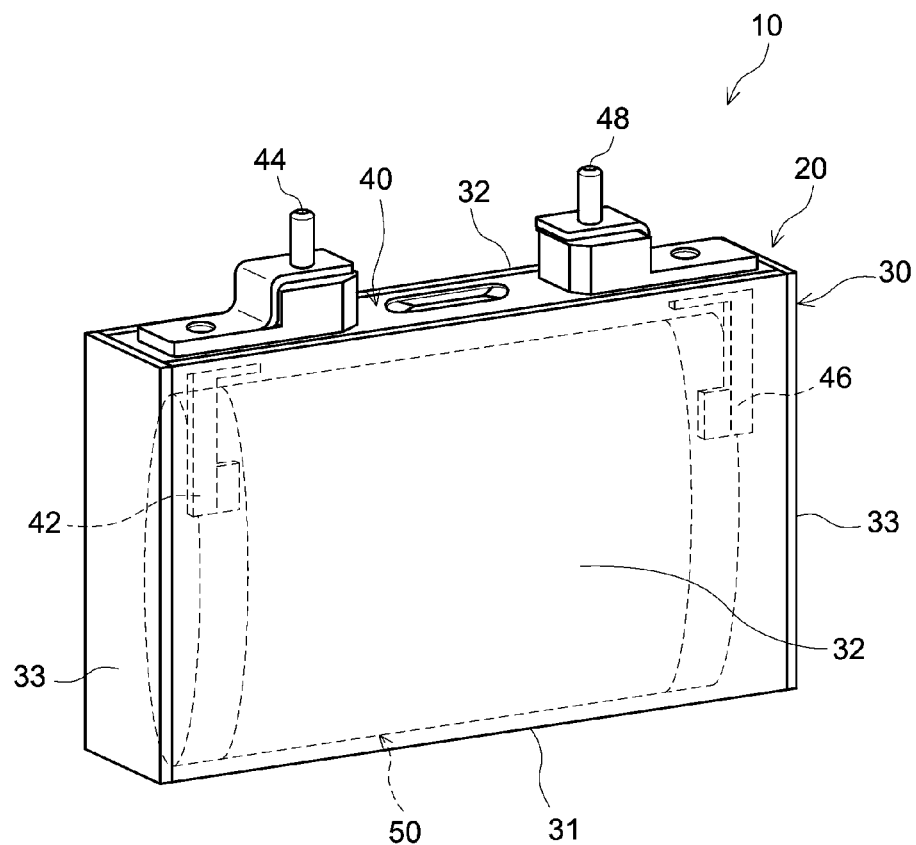
FIG. 1 is a schematic perspective view of a square battery according to an embodiment.

Referring to the drawings, preferred embodiments of technology disclosed herein will be described below. Note that matters other than those particularly mentioned in the present specification and necessary for implementation of the present invention (e.g., a typical configuration of a battery which does not characterize the present invention and a production process therefor) can be understood as design matters of those skilled in the art based on the conventional art in the field. The present invention can be implemented based on contents disclosed in the present specification and common general technical knowledge in the field.

Note that, in the present specification, "battery" is a term referring to any power storage device from which electric energy can be retrieved, which is a concept including a primary battery and a secondary battery. Also, in the present specification, "second battery" is a term referring to any power storage device that can repeatedly be charged/discharged, which is a concept including a so-called storage battery (chemical battery) such as a lithium ion secondary battery or a nickel hydride battery and a capacitor (physical battery) such as an electric double layer capacitor.

First Embodiment

Figure 2:
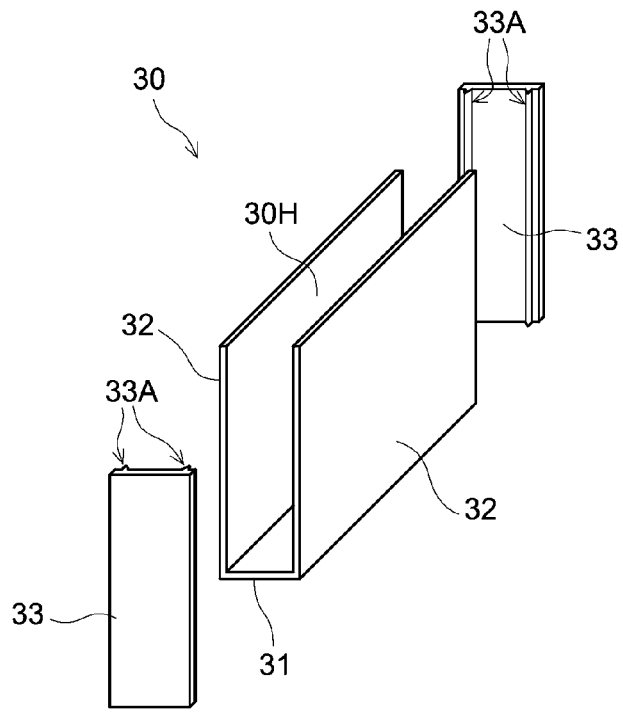
FIG. 2 is an exploded perspective view of a case main body according to the embodiment.
Figure 3:
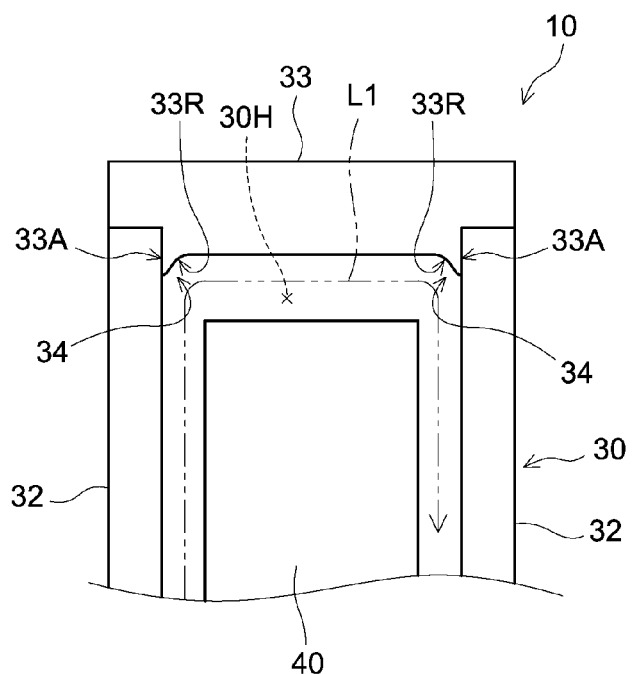
FIG. 3 is a schematic plan view of a portion of the square battery according to the embodiment.

FIG. 1 is a schematic perspective view of a square battery 10 according to the first embodiment. FIG. 2 is a schematic exploded perspective view of a case main body 30. FIG. 3 is a schematic plan view of a portion of the square battery 10. As illustrated in FIG. 1, the square battery 10 includes a battery case 20 and an electrode body 50 contained within the battery case 20. The square battery 10 used herein further includes an electrolyte contained within the battery case 20, though illustration thereof is omitted. A description will be given sequentially of the individual components.

As illustrated in FIG. 1, the battery case 20 is a container containing therein the electrode body 50. The battery case 20 is hermetically sealed herein. The battery case 20 is typically made of a metal such as aluminum, an aluminum alloy, or stainless steel. The battery case 20 has a hexahedral outer shape (which is substantially in the form of a cuboid herein). The battery case 20 includes the case main body 30 and a lid 40.

As illustrated in FIG. 2, the case main body 30 has a rectangular (oblong) bottom surface portion 31, a pair of wider surface portions 32 facing each other, and a pair of narrower surface portions 33 facing each other and having widths smaller than those of the wider surface portions 32. The wider surface portions 32 are side surfaces each having, as a side thereof, a longer side of the bottom surface portion 31. The narrower surface portions 33 are side surfaces each having, as a side thereof, a shorter side of the bottom surface portion 31. The pair of narrower surface portions 33 are interposed between the pair of wider surface portions 32. The bottom surface portion 31 and the wider surface portions 32 are integrally formed herein. The bottom surface portion 31 and the wider surface portions 32 are formed by folding, e.g., a quadrilateral (typically rectangular) flat plate into a substantially U-shaped shape based on dimensions of the battery case 20. In other words, the bottom surface portion 31 and the wider surface portions 32 are included in a folded product. The wider surface portion 32 and the narrower surface portion 33 adjacent to each other are bonded (e.g., weld-bonded) together. The bonding can be performed by, e.g., laser welding or the like. A surface of the case main body 30 facing the bottom surface portion 31 has an opening (is opened).

As illustrated in FIG. 3, in an opening 30H (see also FIG. 2) of the case main body 30, an inner side of a corner portion 34 between the wider surface portion 32 and the narrower surface portion 33 adjacent to each other has an R-shape. In the first embodiment, a R-portion 33R of each of projecting portions 33A of the narrower surface portions 33 described later has the R-shape.

As illustrated in FIG. 2, each of the narrower surface portions 33 includes the pair of projecting portions 33A extending in a longitudinal direction (i.e., a short direction of the wider surface portions 32). As illustrated in FIG. 3, each of the projecting portions 33A is formed with the R-portion 33R having the R-shape. The R-portion 33R is an example of a first R-portion. The R-portions 33R are formed by compression molding or cutting machining. The projecting portions 33A are disposed on respective inner sides of the pair of wider surface portions 32.

As illustrated in FIG. 1, to the lid 40, a positive electrode inner terminal 42 electrically connected to a positive electrode of the electrode body 50 within the case main body 30, a positive electrode outer terminal 44 electrically connected to the positive electrode inner terminal 42 and projecting to an outside of the case main body 30, a negative electrode inner terminal 46 electrically connected to a negative electrode of the electrode body 50 within the case main body 30, and a negative electrode outer terminal 48 electrically connected to the negative electrode inner terminal 46 and projecting to the outside of the case main body 30 are attached.

As illustrated in FIG. 3, the lid 40 is bonded to the case main body 30 so as to close the opening 30H (see also FIG. 2) of the case main body 30. The lid 40 is bonded to the wider surface portions 32 and to the narrower surface portions 33. More specifically, an outer edge of the lid 40 is welded (weld-bonded) to respective inner sides of the wider surface portions 32, the narrower surface portions 33, and the corner portions 34. In other words, the lid 40 is disposed within the case main body 30, and is not disposed on an upper surface of the case main body 30. In the first embodiment, the outer edge of the lid 40 is welded (weld-bonded) to the R-portions 33R of the projecting portions 33A. Since the inner side of the corner portion 34 between the wider surface portion 32 and the narrower surface portion 33 adjacent to each other has the R-shape, when, e.g., laser light passes by the corner portion 34, it is possible to curvaceously move the laser light, as indicated by an arrow L1 in FIG. 3. In other words, when the laser light passes by the corner portion 34, a moving speed of the laser light does not become zero, and the laser light can move at a moving speed equal to that at which the laser light moves along respective linear portions of the wider surface portions 32 and the narrower surface portions 33 of the case main body 30. This allows the lid 40 and the case main body 30 to be appropriately bonded together.

The electrode body 50 is contained within the battery case 20. The electrode body 50 may appropriately be the same as an existing electrode body, and is not particularly limited. The electrode body 50 typically has a plurality of the positive electrodes and a plurality of the negative electrodes, though illustration thereof is omitted. Each of the positive electrodes includes a positive electrode current collector and a positive electrode active material layer firmly fixed to the positive electrode current collector and including a positive electrode active material. Each of the negative electrodes includes a negative electrode current collector and a negative electrode active material layer firmly fixed to the negative electrode current collector and including a negative electrode active material. The electrode body 50 used herein is a flat wound electrode body including the strip-shaped positive electrodes and the strip-shaped negative electrodes which are wound in an insulated state. The wound electrode body can be produced by, e.g., stacking the strip-shaped positive electrodes and the strip-shaped negative electrodes via strip-shaped separators, winding the positive electrodes, the negative electrodes, and the separators in a winding axial direction (which is the same as the longitudinal direction of the wider surface portions 32 herein), and then laterally squashing and spreading the wound positive electrodes, the wound negative electrodes, and the wound separators. Note that the electrode body 50 may also be a stacked electrode body including the quadrilateral (typically rectangular) positive electrodes and the quadrilateral (typically rectangular) negative electrodes which are stacked in an insulated state.

Second Embodiment

Figure 4:
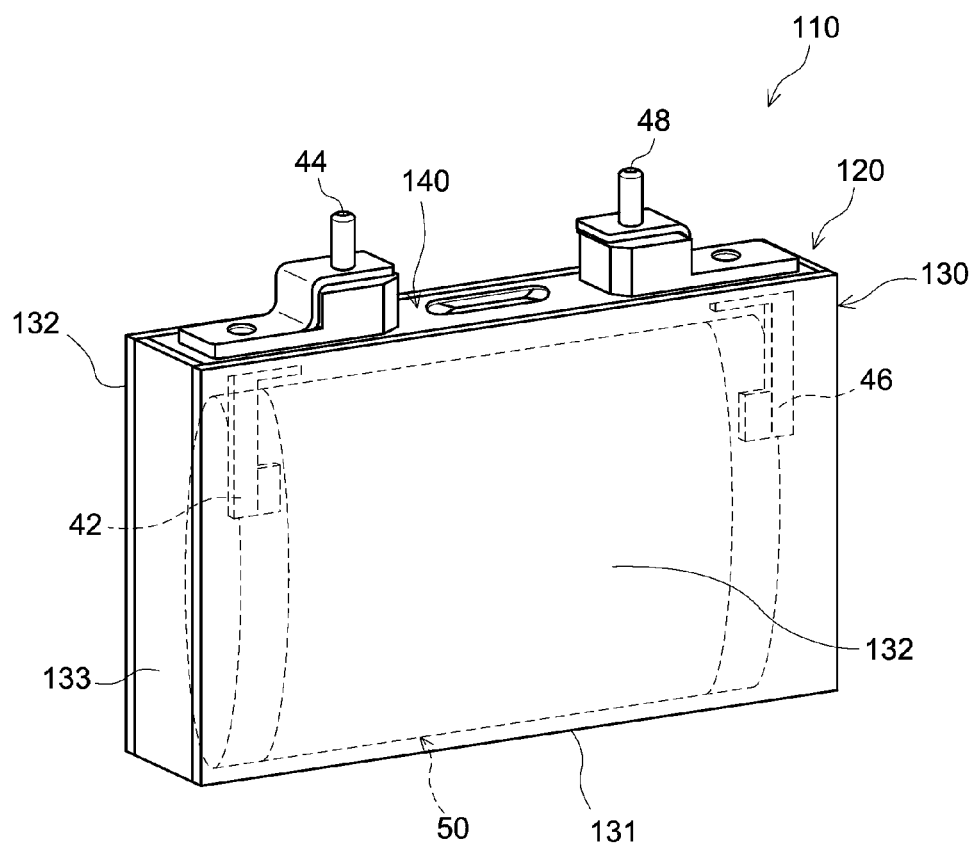
FIG. 4 is a schematic perspective view of a square battery according to another embodiment.
Figure 5:
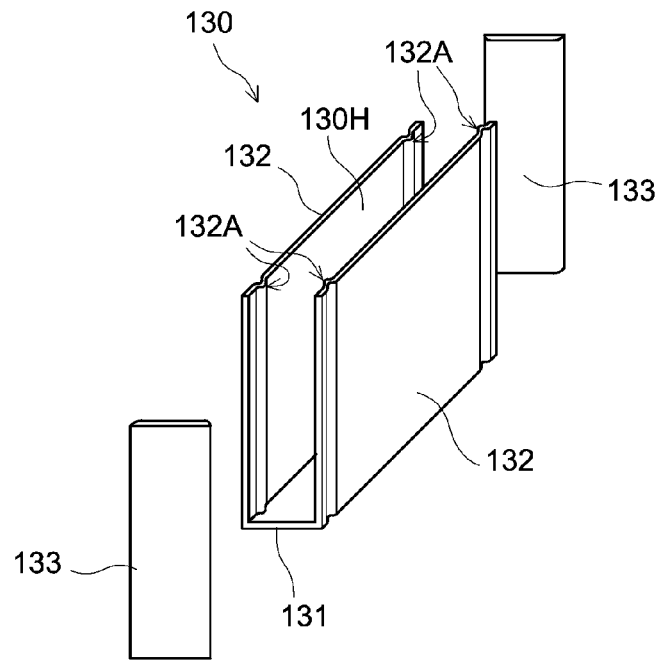
FIG. 5 is a schematic exploded perspective view of a case main body according to the other embodiment.
Figure 6:
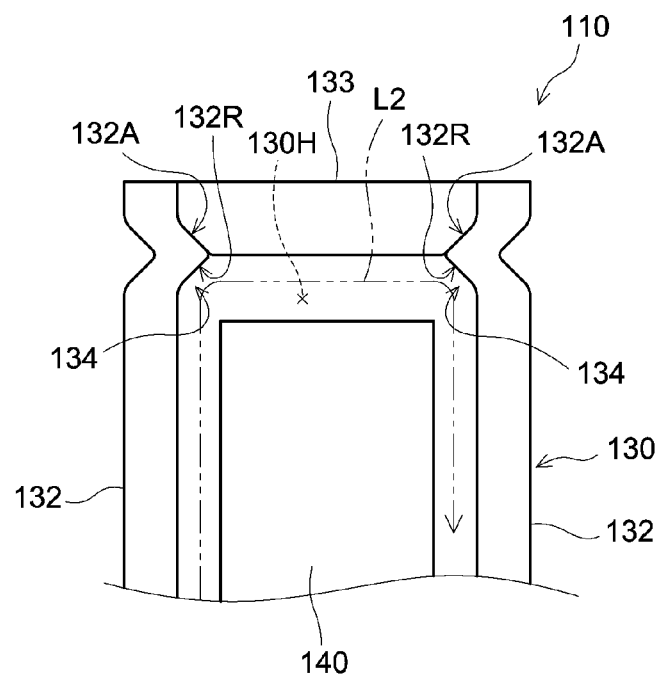
FIG. 6 is a schematic plan view of a portion of the square battery according to the other embodiment.

FIG. 4 is a schematic perspective view of a square battery 110 according to a second embodiment. FIG. 5 is a schematic exploded perspective view of a case main body 130. FIG. 6 is a schematic plan view of a portion of the square battery 110. As illustrated in FIG. 4, the square battery 110 includes a battery case 120 and the electrode body 50 contained within the battery case 120. The square battery 110 used herein further includes an electrolyte contained within the battery case 120, though illustration thereof is omitted. A description will be given sequentially of the individual components.

As illustrated in FIG. 4, the battery case 120 is a container containing therein the electrode body 50. The battery case 120 is hermetically sealed herein. The battery case 120 is typically made of a metal such as aluminum, an aluminum alloy, or stainless steel. The battery case 120 has a hexahedral outer shape (which is substantially in the form of a cuboid herein). The battery case 120 includes the case main body 130 and a lid 140.

As illustrated in FIG. 5, the case main body 130 has a rectangular (oblong) bottom surface portion 131, a pair of wider surface portions 132 facing each other, and a pair of narrower surface portions 133 facing each other and having widths smaller than those of the wider surface portions 132. The wider surface portions 132 are side surfaces each having, as a side thereof, a longer side of the bottom surface portion 131. The narrower surface portions 133 are side surfaces each having, as a side thereof, a shorter side of the bottom surface portion 131. The pair of narrower surface portions 133 are interposed between the pair of wider surface portions 132. The bottom surface portion 131 and the wider surface portions 132 are integrally formed herein.

The bottom surface portion 131 and the wider surface portions 132 are formed by folding, e.g., a quadrilateral (typically rectangular) flat plate into a substantially U-shaped shape based on dimensions of the battery case 120. In other words, the bottom surface portion 131 and the wider surface portions 132 are included in a folded product. The wider surface portion 132 and the narrower surface portion 133 adjacent to each other are bonded (e.g., weld-bonded) together. A surface of the case main body 130 facing the bottom surface portion 131 has an opening (is opened).

As illustrated in FIG. 6, in an opening 130H (see also FIG. 3) of the case main body 130, an inner side of a corner portion 134 between the wider surface portion 132 and the narrower surface portion 133 adjacent to each other has an R-shape. In the second embodiment, a R-portion 132R of each of projecting portions 132A of the wider surface portions 132 described later has the R-shape.

As illustrated in FIG. 5, each of the wider surface portions 132 includes the pair of projecting portions 132A extending in a short direction (i.e., a longitudinal direction of the narrower surface portions 133). The pair of projecting portions 132A face each other. In other words, the projecting portions 132A of one of the wider surface portions 132 project toward the projecting portions 132A of the other wider surface portion 132. The pair of projecting portions 132A are provided at both end portions of each of the wider surface portions 132. As illustrated in FIG. 6, each of the projecting portions 132A is formed with the R-portion 132R having the R-shape. The R-portion 132R is an example of a second R-portion. The R-portions 132R are formed by beading.

As illustrated in FIG. 6, the lid 140 is bonded to the case main body 130 so as to close the opening 130H (see also FIG. 5) of the case main body 130. The lid 140 is bonded to the wider surface portions 132 and to the narrower surface portions 133. More specifically, an outer edge of the lid 140 is welded (weld-bonded) to respective inner sides of the wider surface portions 132, the narrower surface portions 133, and the corner portions 134. In other words, the lid 140 is disposed within the case main body 130, and is not disposed on an upper surface of the case main body 130. In the second embodiment, the outer edge of the lid 140 is welded (weld-bonded) to the R-portions 132R of the projecting portions 132A. Since the inner side of the corner portion 134 between the wider surface portion 132 and the narrower surface portion 133 adjacent to each other has the R-shape, when, e.g., laser light passes by the corner portion 134, it is possible to curvaceously move the laser light, as indicated by an arrow L2 in FIG. 6. In other words, when the laser light passes by the corner portion 134, a moving speed of the laser light does not become zero, and the laser light can move at a moving speed equal to that at which the laser light moves along respective linear portions of the wider surface portions 132 and the narrower surface portions 133 of the case main body 130. This allows the lid 140 and the case main body 130 to be appropriately bonded together.

Each of the square battery 10 and the square battery 110 is usable for various applications, and can particularly be used preferably as a large-size (large-capacity) battery having a high energy density. Examples of preferable applications include motor power sources (vehicle driving power sources) to be mounted in vehicles such as an electric vehicle (EV), a hybrid vehicle (HV), and a plug-in hybrid vehicle (PHV).

While the specific examples of the present invention have been described heretofore in detail, the embodiments described above are only exemplary, and are not intended to limit the scope of claims. The technology described in the scope of claims include various modifications and changes of the specific examples exemplified above.

In each of the embodiments described above, the narrower surface portions 33 or 133 are formed separately from the bottom surface portion 31 or 131 and from the wider surface portions 32 or 132. However, the narrower surface portions 33 or 133, the bottom surface portion 31 or 131, and the wider surface portions 32 or 132 may also be formed integrally. For example, it may also be possible to use a folded product obtained by folding a flat plate in which the narrower surface portions 33 or 133 and the wider surface portions 32 or 132 are bonded (e.g., weld-bonded) together.

In the embodiment described above, the projecting portions 33A are formed over the entire longitudinal direction of the narrower surface portions 33. However, the projecting portions 33A may also be formed only on a periphery of the opening 30H where the projecting portions 33A can come into contact with the outer edge of the lid 40. Meanwhile, the projecting portions 132A are formed over the entire short direction of the wider surface portions 132. However, the projecting portions 132A may also be formed only on a periphery of the opening 130H where the projecting portions 132A can come into contact with the outer edge of the lid 140.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principle of the present invention. These preferred embodiments are provided with the understanding that they are not intended to limit the present invention to the preferred embodiments described in the specification and/or shown in the drawings. The present invention is not limited to the preferred embodiment described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A square battery, comprising:
   an electrode body; and
   a battery case containing therein the electrode body,
   the battery case including:
      a case main body having a square shape substantially in a form of a cuboid having an open side surface; and
      a lid bonded to the case main body so as to close an opening of the case main body, wherein
   the case main body comprises:
      a folded plate including
         a rectangular bottom surface portion, and
         a pair of wider rectangular surface portions facing each other, each of the pair of wider rectangular surface portions having a side corresponding to a longer side of the rectangular bottom surface portion; and
      a pair of rectangular flat plates facing each other, each of the pair of rectangular flat plates having a side corresponding to a shorter side of the rectangular bottom surface portion,
   the folded plate and each of the pair of rectangular flat plates are bonded together,
   at a boundary between the folded plate and said each of the pair of rectangular flat plates in the opening of the case main body, an inner side of a corner portion has an R-shape,
   the side of each of the pair of rectangular flat plates corresponding to the shorter side of the rectangular bottom surface portion includes
      a pair of projecting portions protruding toward the lid and spaced apart from each other, each of the pair of projecting portions including the corner portion, and
      a first surface between the pair of projecting portions and concave away from the lid,
   the inner side of the corner portion of each of the pair of projecting portions is curved inwardly defining the R-shape,
   the lid is disposed within the case main body and is not disposed on an upper surface of the case main body, and
   an outer edge of the lid is welded to the inner side of the corner portion.

2. The square battery according to claim 1, wherein each of the pair of rectangular flat plates comprises a first R-portion having the R-shape.

3. The square battery according to claim 1, wherein each of the pair of wider rectangular surface portions of the folded plate comprises a second R-portion having the R-shape.

4. The square battery according to claim 1, wherein
   the side of each of the pair of rectangular flat plates corresponding to the shorter side of the rectangular bottom surface portion further comprises
      a pair of second surfaces wherein the first surface is between the pair of second surfaces, and
      a pair of third surfaces, each of the pair of third surfaces continuously extending between the first surface and a corresponding second surface of the pair of second surfaces,
   said each of the pair of projecting portions has a corresponding third surface of the pair of third surfaces,
   the pair of second surfaces directly contacts the pair of wider rectangular surface portions, respectively, and
   the pair of third surfaces directly contacts the pair of wider rectangular surface portions, respectively.

5. The square battery according to claim 4, wherein a thickness of said each of the pair of rectangular flat plates at a portion having the first surface is greater than that at a second surface of the pair of second surfaces.

6. The square battery according to claim 5, wherein the outer edge of the lid has a shape corresponding to the first surface and the inner sides of the pair of projecting portions.

* * * * *